(12) United States Patent
Kato

(10) Patent No.: US 7,206,999 B2
(45) Date of Patent: Apr. 17, 2007

(54) FORM PROCESSING METHOD, PROGRAM AND APPARATUS

(75) Inventor: Yutaka Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 10/890,193

(22) Filed: Jul. 14, 2004

(65) Prior Publication Data

US 2005/0022112 A1 Jan. 27, 2005

(30) Foreign Application Priority Data

Jul. 25, 2003 (JP) .............................. 2003-279972

(51) Int. Cl.
*G06F 15/00* (2006.01)

(52) U.S. Cl. ...................... 715/508; 715/507

(58) Field of Classification Search ................ 715/505, 715/506, 507, 508

See application file for complete search history.

(56) References Cited

U.S. PATENT DOCUMENTS

| | | | | |
|---|---|---|---|---|
| 5,247,611 A * | 9/1993 | Norden-Paul et al. ...... | 715/504 |
| 5,588,099 A * | 12/1996 | Mogilevsky et al. ........ | 715/508 |
| 5,819,268 A * | 10/1998 | Hackett .......................... | 707/6 |
| 5,835,917 A * | 11/1998 | Shin et al. .................... | 715/509 |
| 5,867,159 A * | 2/1999 | Hamada et al. .............. | 345/443 |
| 6,044,383 A * | 3/2000 | Suzuki et al. ................ | 715/509 |
| 6,055,550 A * | 4/2000 | Wallack ........................ | 715/509 |
| 6,757,870 B1 * | 6/2004 | Stinger ......................... | 715/513 |
| 6,816,630 B1 * | 11/2004 | Werth et al. ................. | 382/287 |
| 6,854,085 B1 * | 2/2005 | Morse .......................... | 715/507 |
| 7,028,255 B1 * | 4/2006 | Ayers ........................... | 715/517 |
| 2001/0007959 A1 * | 7/2001 | Abdalla ........................ | 700/25 |
| 2001/0049699 A1 * | 12/2001 | Pratley et al. ............... | 707/503 |
| 2003/0014437 A1 * | 1/2003 | Beaumont et al. .......... | 707/508 |
| 2003/0229848 A1 * | 12/2003 | Arend et al. ................. | 715/509 |
| 2004/0268229 A1 * | 12/2004 | Paoli et al. .................. | 715/508 |

FOREIGN PATENT DOCUMENTS

JP          2001-283140          10/2001

OTHER PUBLICATIONS

Chen et al., Mining Tables from Large Scale HTML Texts, ACM Jul. 2000, p. 166-172.*

* cited by examiner

*Primary Examiner*—Cong-Lac Huynh
(74) *Attorney, Agent, or Firm*—Fitzpatrick, Cella, Harper & Scinto

(57) ABSTRACT

An object of the invention is to provide a form processing technique relating to the outputting of a tabular-format object in a form generated by entering field data into a field, wherein the technique makes it possible to generate a form having an attractive appearance irrespective of the amount of data in the field data. To attain this object, a form processing program according to the invention has functions for determining whether a setting has been made to link and output the output position of the object to the output position of a variable-length table that will be output on a form; acquiring an offset value of the linked object if it has been determined that a setting has been made to link and output the output position of the object; and deciding and outputting the output position of the object based upon the output position of the variable-length table and the offset value. The program further includes a function for setting the form file of the form based upon an indication from the user in such a manner that the object will be linked to the table and then output, and a function for storing the setting that has been made.

24 Claims, 13 Drawing Sheets

FORM PROCESSING METHOD, PROGRAM AND APPARATUS

CLAIM OF PRIORITY

This application claims priority from Japanese Patent Application No. 2003-279972 filed on Jul. 25, 2003, the entire contents of which are incorporated herein by reference.

FIELD OF THE INVENTION

This invention relates to a form processing technique for entering data that is described in a data file (this data shall be referred to as "field data" below) to into a "field" (a memory area in a program that accepts field data) defined beforehand in a "form file" that indicates the layout of a form, thereby generating a form that incorporates the field data.

BACKGROUND OF THE INVENTION

As shown in FIG. 4, conventionally a form is generated using a form file 400 indicative of the layout of a form (420). When field data 410 is entered into a field, control is performed in such a manner that the field data 410 will be output in an output area defined by a "field object" 402 [a graphic indicating the output area of the field data 410, which has been entered into the field, on the form (420)] described in the form file 400. This control generates the form (for example, see the specification of Japanese Patent Application Laid-Open No. 2001-283140).

It is possible to specify the output style (output format) of the field data 410 with respect to the field object 402. In general, a character for specifying the output format is referred to as an "output picture". For example, if it has been so defined that an output picture "K" outputs just one character, control is performed so as to extract and output not a numerical value but only a character from the field data that has been entered. In a case where there are five "K"s, as shown in FIG. 4, control is performed in such a manner that up to five characters of field data will be output into the field object 402.

Furthermore, with regard to the field object 402, it is possible to define it so that a tabular object (table), for example, will be output using the entered field data 410. Examples of tabular-format objects that can be defined so as to be output into the field object 402 are a variable table in which the number of table lines changes in accordance with the amount of data in the field data 410, and a fixed table in which the number of table lines is constant irrespective of the amount of data in the field data 410.

FIG. 5 is a diagram illustrating the manner in which a form 520 is generated by entering field data 510 into a form file 500 defined in such a manner that a tabular object (a variable table) will be output into a field object 502. As illustrated in FIG. 5, the form (an invoice in this case) 520 that has been output spans three pages, on the third page of which the number of lines of the table is made two in conformity with the amount data in the field data 510.

However, in a case where the form file has been defined in such a manner that a tabular object will be output into the field object, there are instances where, depending upon the amount of data in the field data, the form in which the field data has been incorporated takes on an unattractive appearance.

For example, as shown in FIG. 6, it is possible to place a separate object 604 underneath a field object 602 in the creation of a form file. With a variable table, however, if the amount of data in field data 610 is small, then an unnecessary blank space 621 is formed between the object 604 placed beneath the field object 602 and the last line of the table that is output into the field object 602. In the case of a fixed table, on the other hand, it is possible to so arrange it that such a blank space will not be created. Instead, however, if the amount of data in the field data 610 is small, blank lines 631 in the field data 610 that are devoid of entries will be output.

Thus, if a form file is defined in such a manner that a tabular object will be output, then, in the case of a variable table, a blank space will be formed between the last line of the table that is output into the field object and an object placed beneath the field object. In the case of a fixed table, blank lines in which no field data has been entered will appear. A problem which arises, therefore, is that the form produced in either case will be unattractive depending upon the amount data in the field data.

SUMMARY OF THE INVENTION

Accordingly, an object of the present invention is to provide a form processing technique relating to the outputting of a tabular-format object in a form generated by entering field data into a field, wherein the technique makes it possible to generate a form having an attractive appearance irrespective of the amount of data in the field data.

According to the present invention, the foregoing object is attained by providing a form processing method for generating a form by entering data into a form file, which has a field object indicating an output area of the data to be entered into a field, and an object that appears in an area other than the field object, and causing the data to be output in the output area indicated by the field object, the method comprising a linkage determining step of determining whether a setting has been made to link an output position of the object to an output position of the field object into which a variable-length table is output by entering the data; if it has been determined at the linkage determination step that a setting has been made to link the output position of the object, an offset-value acquisition step of acquiring an offset value between the output position of the object and the output position of the field object into which the variable-length table is output; and an output step of deciding and outputting the output position of the object based upon the offset value and the output position of the field object into which the variable-length table is output.

Further, the form processing method includes a setting step of setting the form file, wherein the setting step includes a linkage setting step of making a setting, based upon an indication from a user, in such a manner that the output position of the object and the output position of the field object into which the variable-length table is output will be linked by way of the offset value, and a storing step of storing a set value that has been set at the linkage setting step.

Further, according to the present invention, the foregoing object is attained by providing a form processing program for causing a computer to implement a form processing method of generating a form by entering data into a form file, which has a field object indicating an output area of the data to be entered into a field, and an object that appears in an area other than the field object, and causing the data to be output in the output area indicated by the field object, the program including program code for causing the computer to execute the following steps: a linkage determining step of determining whether a setting has been made to link an output position of the object to an output position of the field object into which a variable-length table is output by entering the data; if has been determined at the linkage determination step that a setting has been made to link the output position of the object, an offset-value acquisition step of acquiring an offset value between the output position of the object and the output position of the field object into which the variable-length table is output; and an output step of deciding and outputting the output position of the object based upon the offset value and the output position of the field object into which the variable-length table is output.

Further, according to the present invention, the foregoing object is attained by providing a form processing apparatus for generating a form by entering data into a form file, which has a field object indicating an output area of the data to be entered into a field, and an object that appears in an area other than the field object, and causing the data to be output in the output area indicated by the field object, the apparatus comprising: a linkage determining unit configured to determine whether a setting has been made to link an output position of the object to an output position of the field object into which a variable-length table is output by entering the data; an offset-value acquisition unit configured to acquire an offset value between the output position of the object and the output position of the field object into which the variable-length table is output if it has been determined by the linkage determining unit that a setting has been made to link the output position of the object; and an output unit configured to decide and output the output position of the object based upon the offset value and the output position of the field object into which the variable-length table is output.

In accordance with the present invention, it is possible to generate a form having an attractive appearance irrespective of the amount of data in the field data when creating a tabular-format object in a form generated by entering field data into a field Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

A preferred embodiment of the present invention will now be described in detail in accordance with the accompanying drawings.

[First Embodiment]
<Structure of Form Processing Apparatus>

Figure 1:
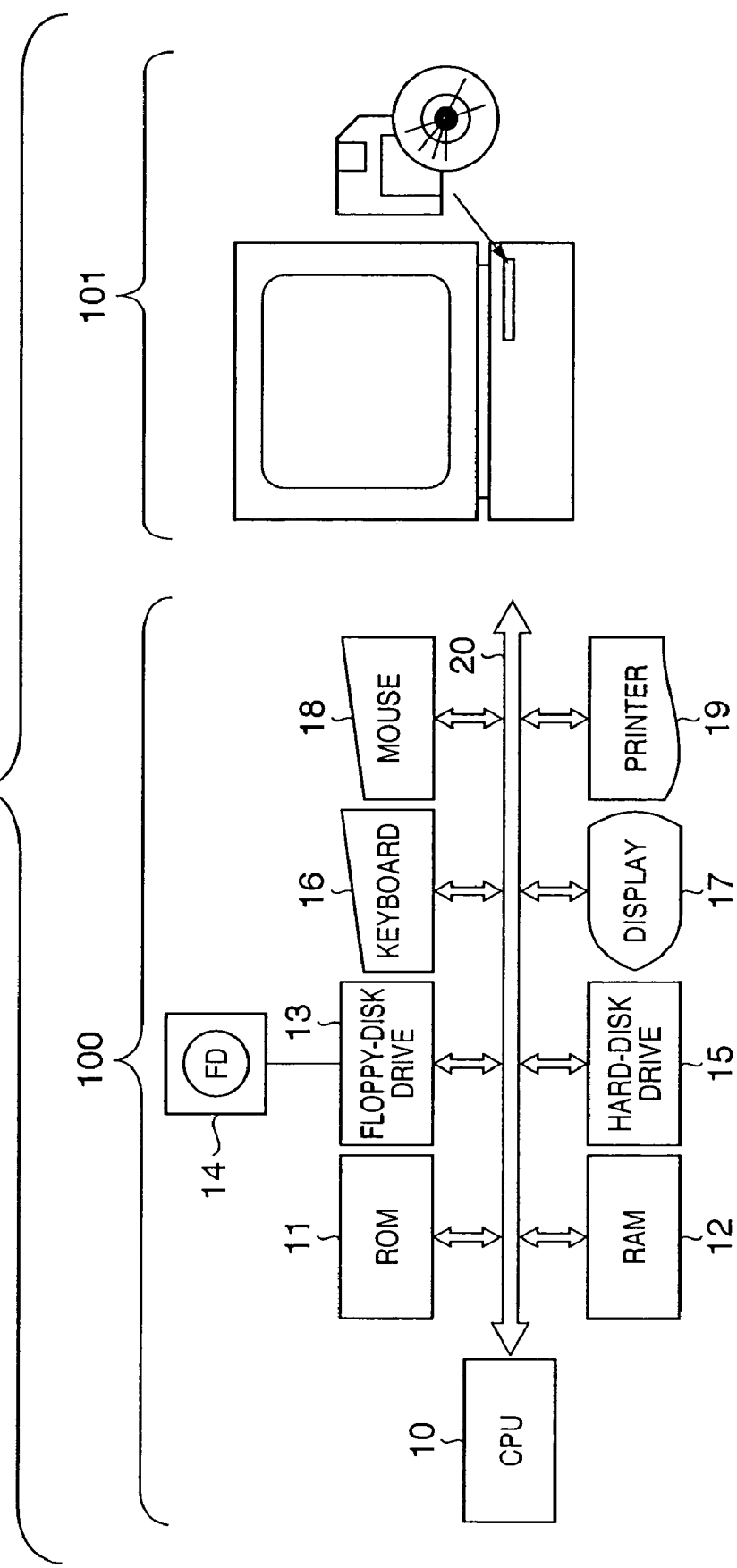
FIG. 1 is a diagram illustrating the hardware implementation and external appearance of a form processing apparatus according to an embodiment of the present invention.

FIG. 1 is a diagram illustrating a form processing apparatus according to this embodiment. The setting of a form file and the output of a form are performed using this form processing apparatus. Reference numeral 100 denotes the hardware configuration of the form processing apparatus and 101 the external appearance thereof.

As illustrated in FIG. 1, the form processing apparatus includes a central processing unit constituted by a CPU 10 or the like; a main storage device comprising a ROM/RAM 12 or the like; an external storage device constituted by a floppy-disk drive 13 or hard-disk drive 15 or the like; a designation input unit comprising a pointing device (coordinate designating means) such as a mouse 18 as well as a keyboard 16; a monitor comprising a CRT display 17 or the like; a printing apparatus 19 constituted by a printer or plotter; and a system bus 20 interconnecting these components. Further, the form processing apparatus 100 is capable of being connected to another computer system via a communication line such as a network. It should be noted that the form processing apparatus 100 can also be implemented by an information processing apparatus such as an ordinary workstation or personal computer.

The form processing apparatus 100 is operated by having the CPU execute a basic input/output program or operating system and a form processing program (a control program for implementing form processing, described later). The basic input/output program is written to the ROM 11 and the operating system is written to the hard-disk drive 15. When the power supply of the form processing apparatus 100 is turned on, the operating system is read into the RAM 12 from the hard-disk drive 15 by IPL (Initial Program Loading) within the basic input/output program, thereby starting up operation of the operating system.

Figure 2:
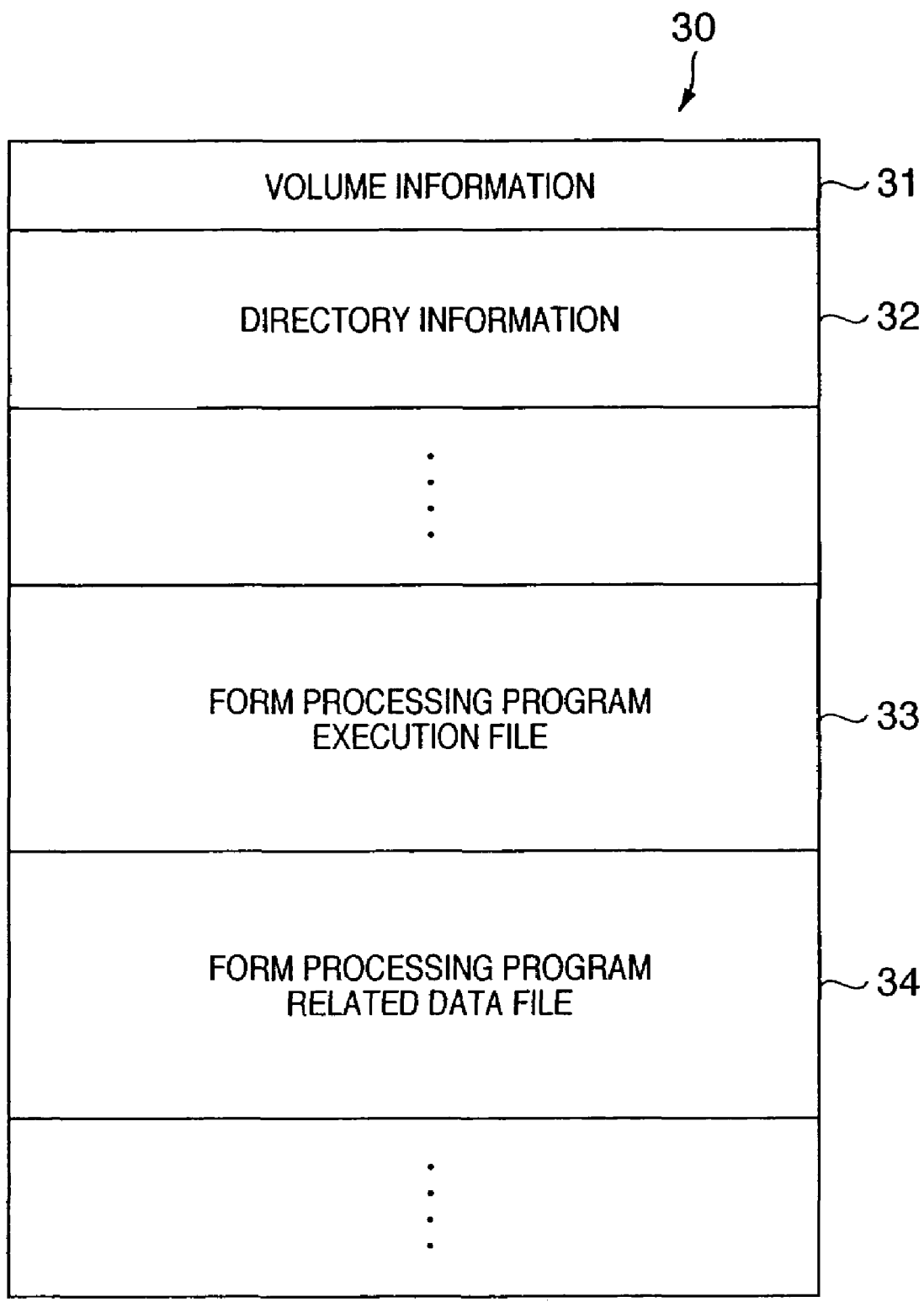
FIG. 2 is a diagram illustrating the structure of content recorded on a floppy disk.
Figure 3:
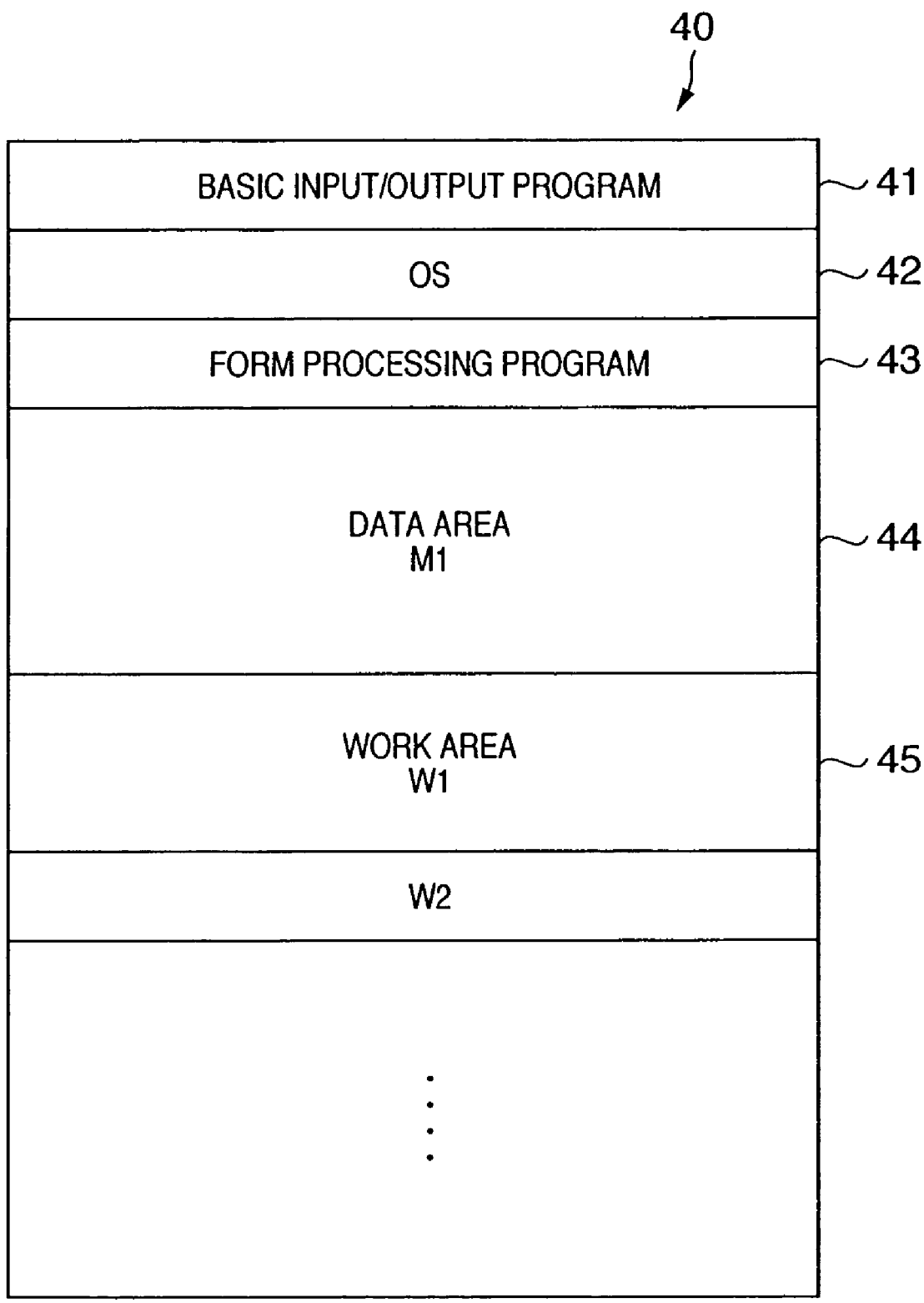
FIG. 3 is a diagram illustrating a memory map in a state in which a form processing program according to this embodiment has been loaded into a RAM and is executable.
Figure 4:
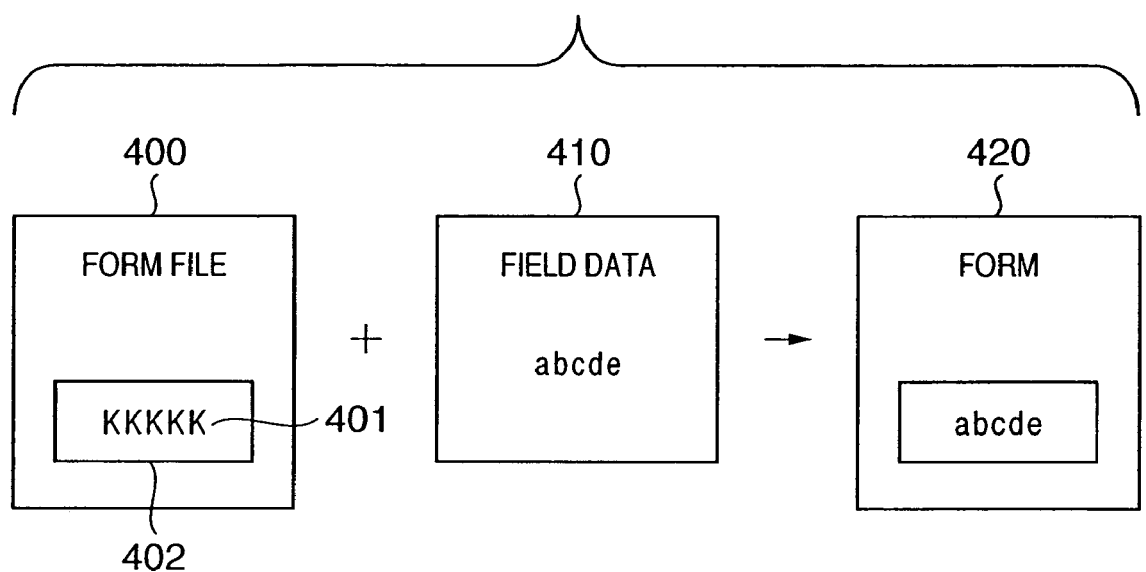
FIG. 4 is a diagram illustrating an example of generation of a form.
Figure 5:
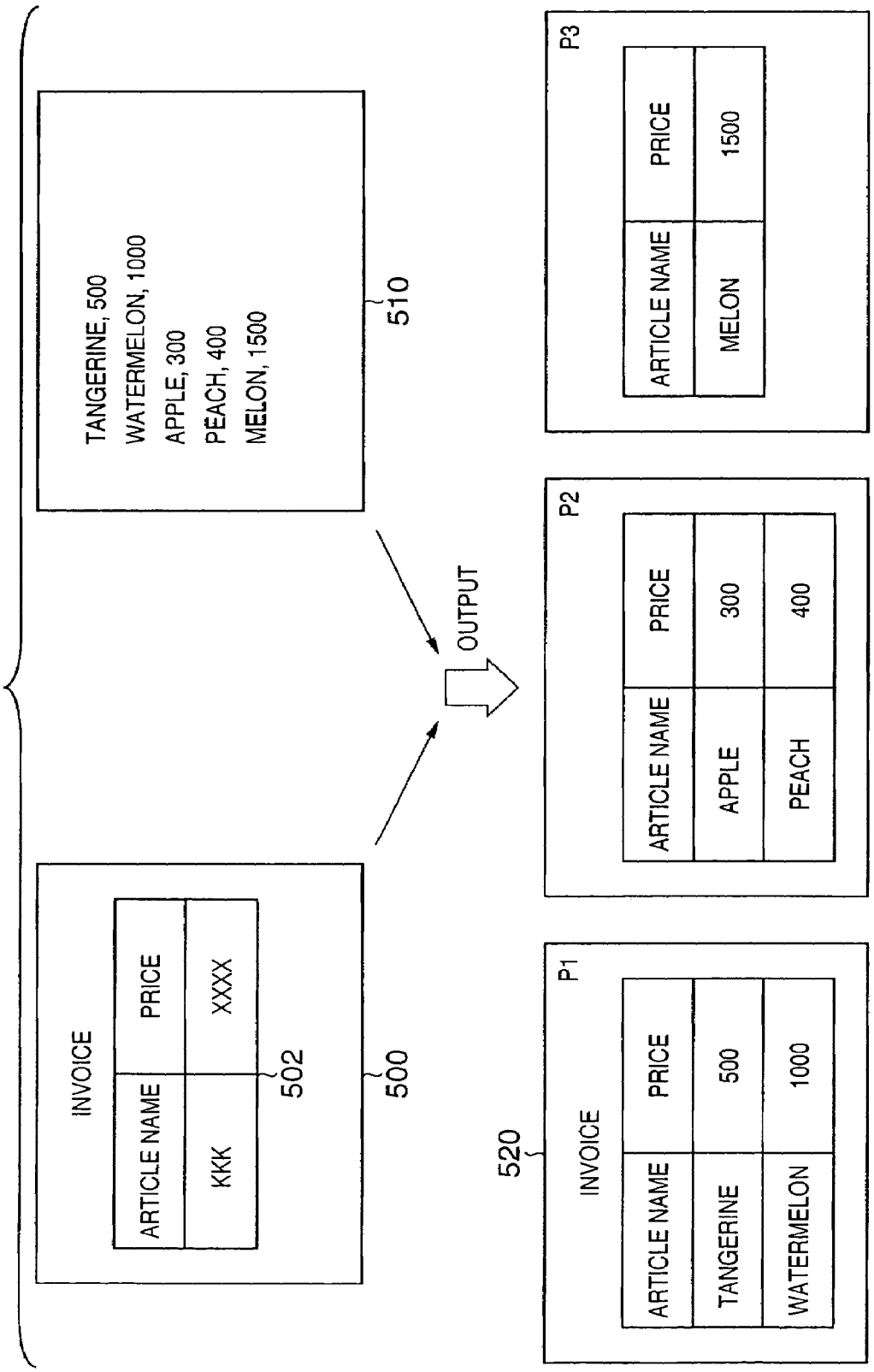
FIG. 5 is a diagram illustrating an example of generation of a form that includes a variable table.
Figure 6:
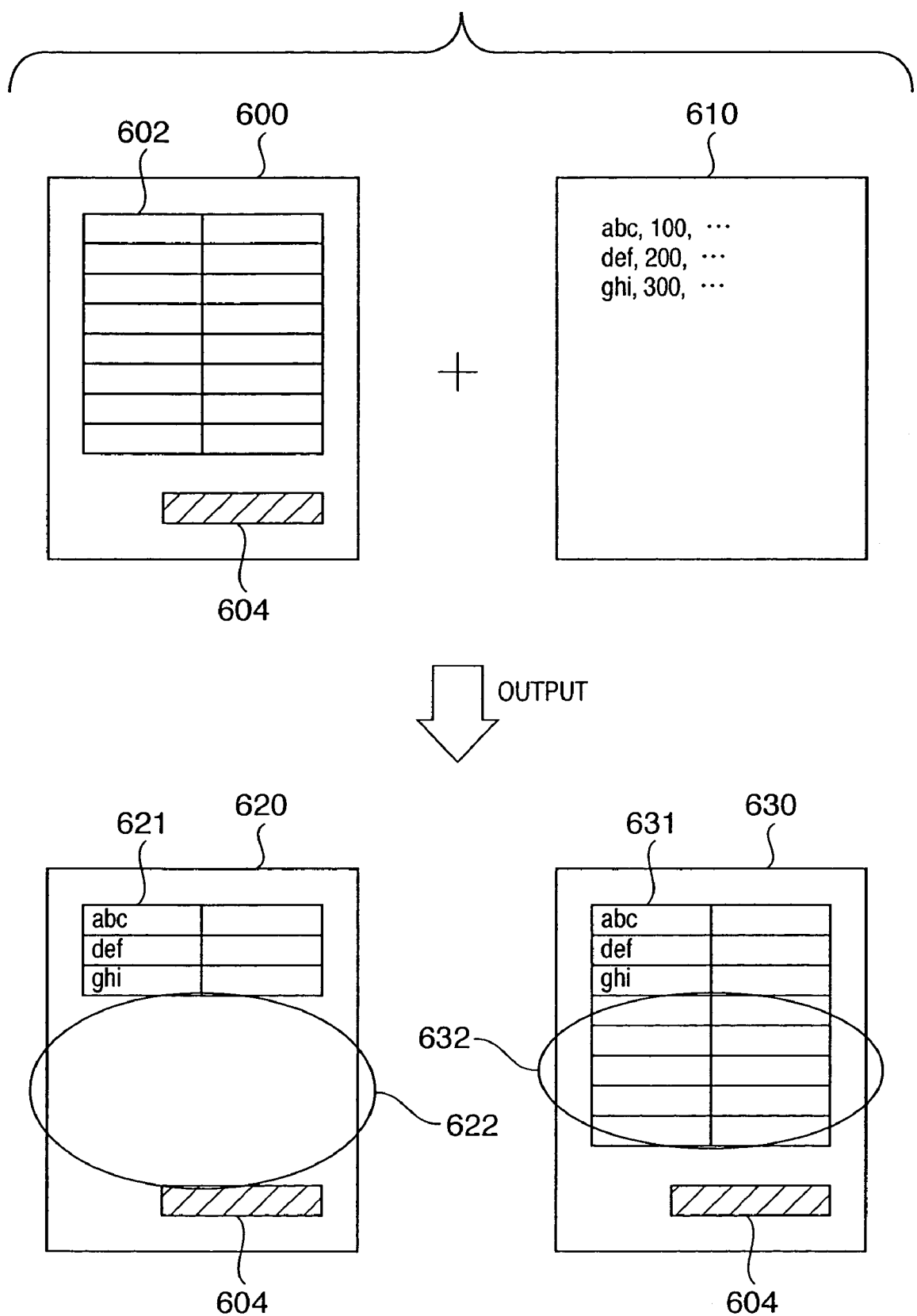
FIG. 6 is a diagram useful in describing a case where a blank space and blank lines have been produced in a form processing apparatus according to the prior art.

Further, the form processing program and related data are registered in a floppy disk 14, the structure of the content of which is as illustrated in FIG. 2. Specifically, a form processing program execution file (33) and a related-data file (34) are loaded into the form processing apparatus 100 through the floppy-disk drive 13, as illustrated in FIG. 1. When the floppy disk 14 is inserted into the floppy-disk drive 13, the form processing program execution file (33)

and related-data file (34) are read out of the floppy disk 14 and loaded into the RAM 12 under the control of the operating system and basic input/output program so that the operation becomes possible. FIG. 3 illustrates a memory map in a state in which the form processing program has been loaded into the RAM 12 and is executable.

This embodiment illustrates an example in which processing is executed upon loading the form processing program execution file (33) and related-data file (34) directly into the RAM 12. However, it may be so arranged that the form processing program execution file (33) and related-data file (34) are installed in the hard-disk drive 15 beforehand and files are then loaded from the hard-disk drive 15 to the RAM 12 when the form processing program execution file (33) is actuated. Further, it is possible for a medium that records the form processing program execution file to use a removable storage medium such as a CD-ROM or IC memory card besides the floppy disk 14. Furthermore, it is possible to record the form processing program execution file in the ROM 11 and use this to form part of the memory map so that the CPU 10 can execute processing directly. Further, it is permissible to adopt an arrangement in which the form processing program execution file is read in from another apparatus via a network and then executed.

<Flow of Form Processing in Form Processing Apparatus>

Figure 10:
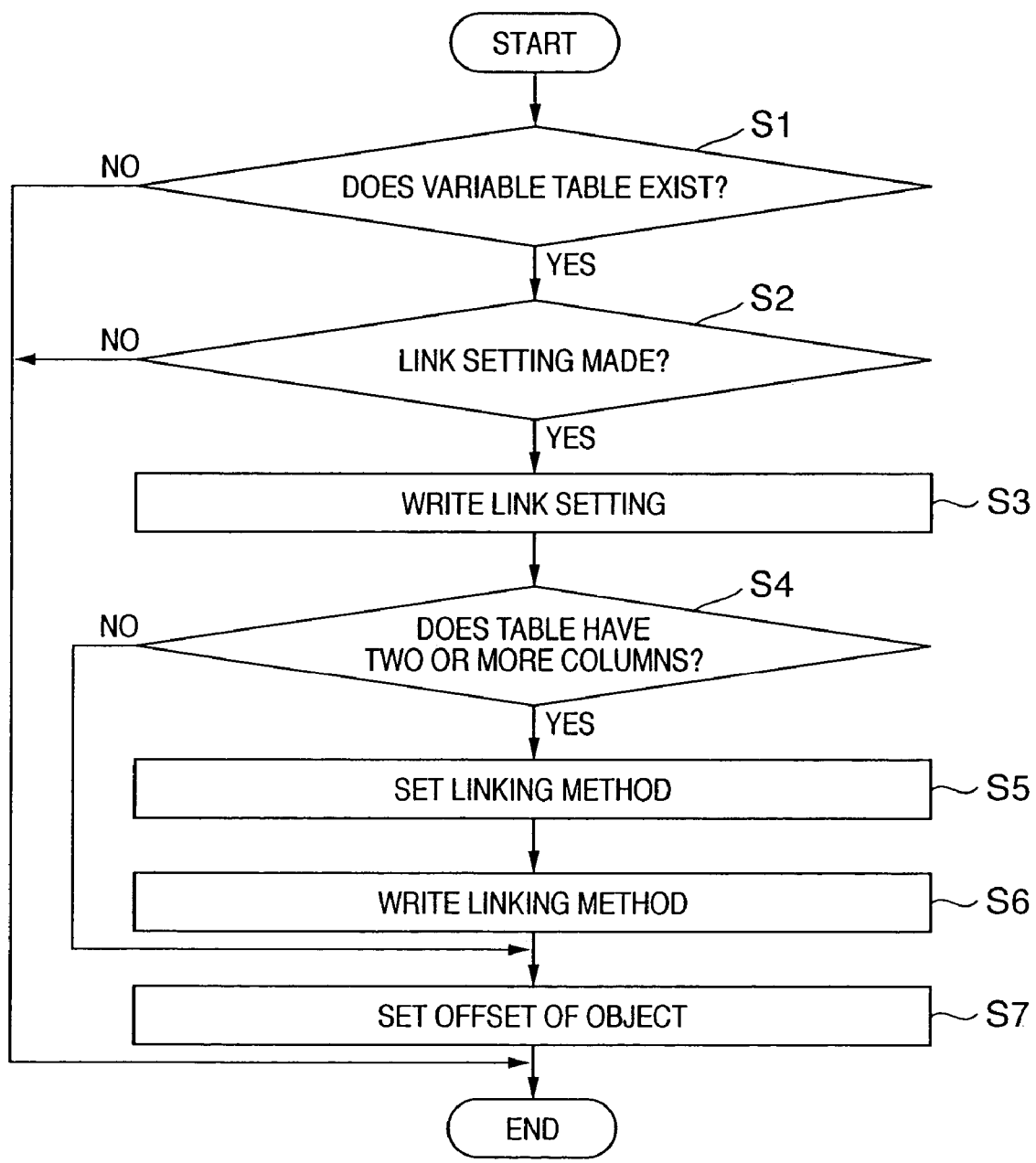
FIG. 10 is a flowchart illustrating the flow of form-file setting processing when a form is generated.
Figure 11:
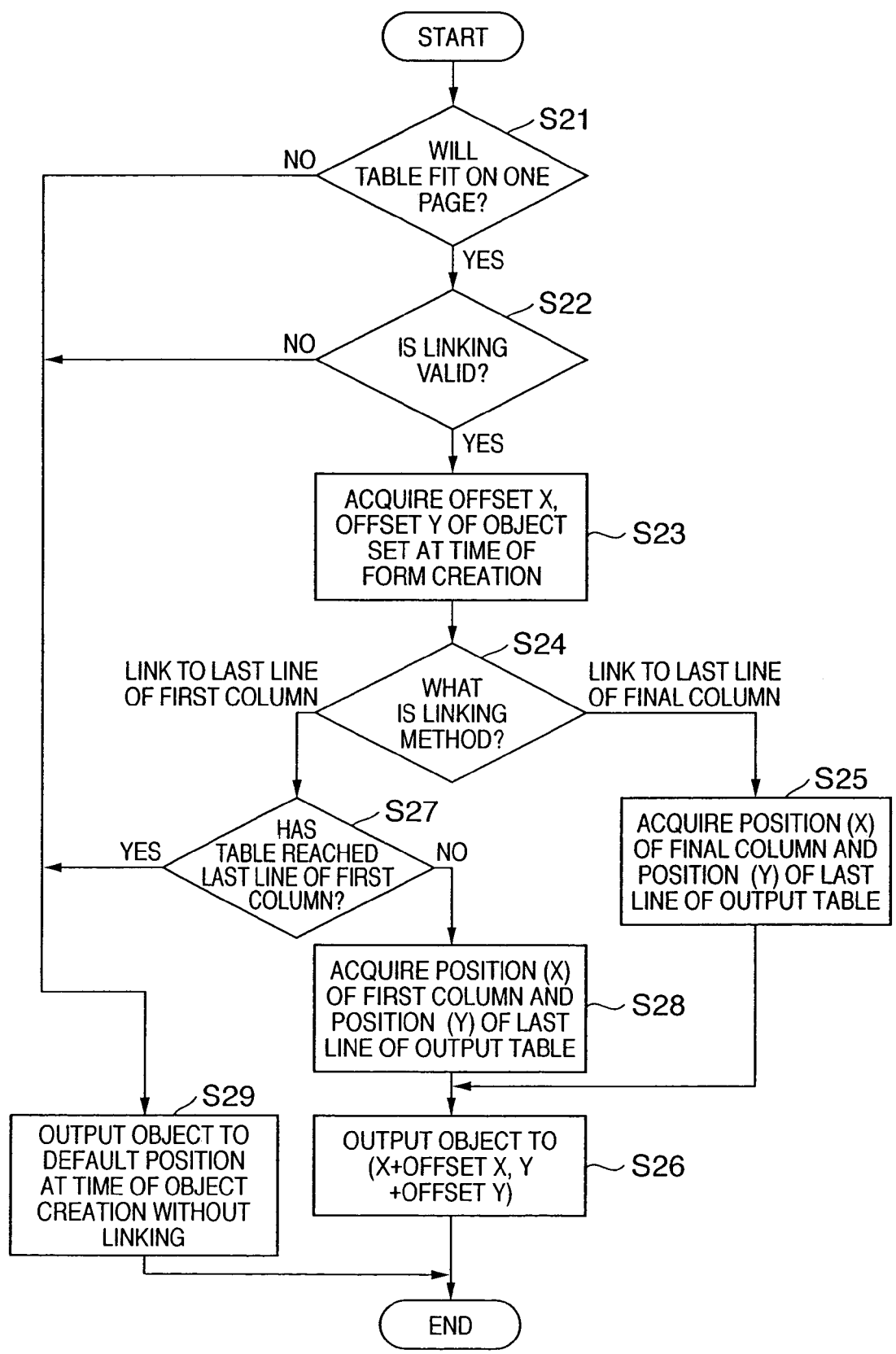
FIG. 11 is a flowchart illustrating the flow of output processing when a form is generated.

The flow of form processing in the form processing apparatus 100 according to this embodiment will be described with reference to FIGS. 10 and 11. The generation of a form is divided into processing for setting a created form file (a form file that has a field object and an object that appears in an area other than that of the field object), and output processing for entering field data into the form file that has undergone setting processing and outputting a form. FIG. 10 is a flowchart illustrating the flow of form-file setting processing executed when a form is generated, and a FIG. 11 is a flowchart illustrating the flow of output processing when a form is generated.

In the setting of a form file in FIG. 10, it is determined whether a variable table exists in the form file created (step S1).

Figure 12:
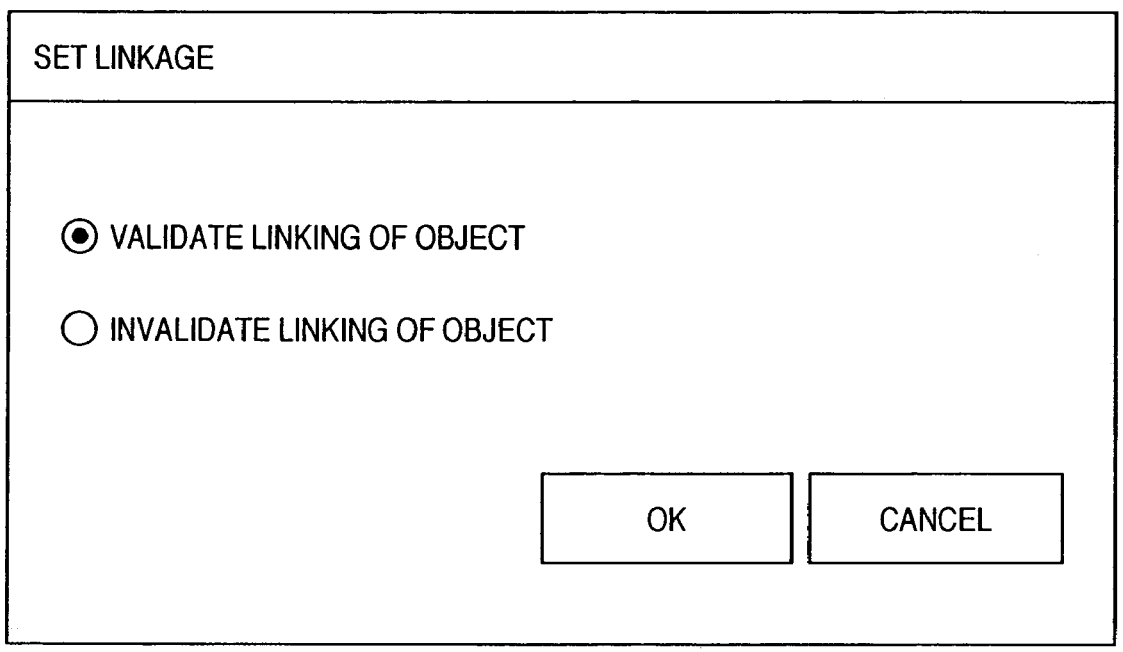
FIG. 12 is a diagram illustrating an example of a designating screen for validating linking of an object.

If it is determined at step S1 that a variable table exists, then it is determined at step S2 whether a setting has been made to link an object to the variable table by an input operation performed by the user. It should be noted that the linkage setting is performed using an attribute dialog box relating to a field object (a field object into which the variable table will be output), as shown in FIG. 12.

Figure 7:
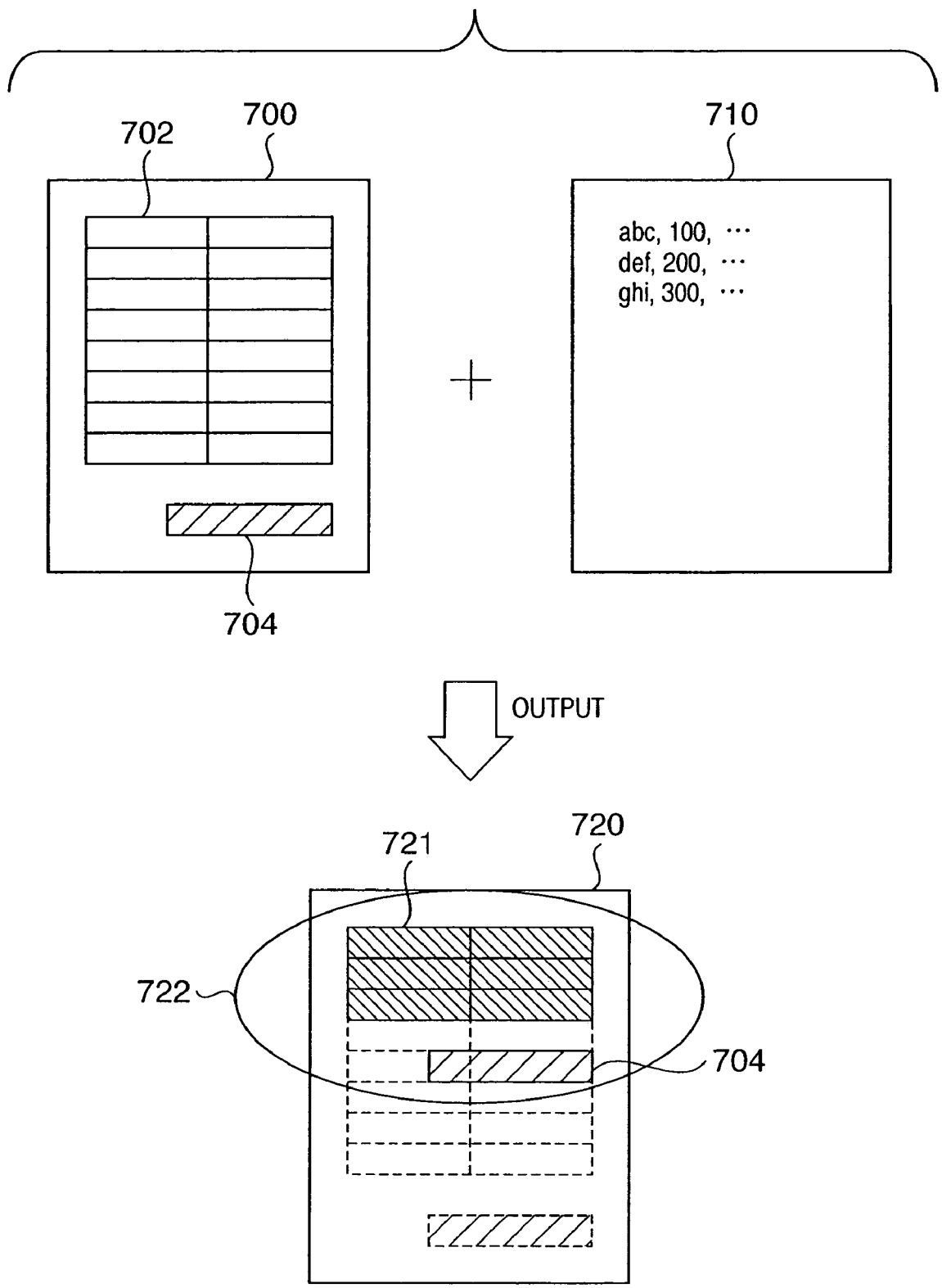
FIG. 7 is a diagram illustrating an example of generation of a form in a case where a setting has been made to link an object to a variable table.

If the fact that linkage has been set is determined at step S2, then a set value is written to the RAM 12 in association with the field object at step S3. Whether the object is linked to the table at the time of output processing can be changed over by the value that has been written in. FIG. 7 is a diagram illustrating an example of generation of a form in a case where an object is linked to a table at the time of output processing. In a case where a field object 702 for outputting a variable table and an object 704 are set forth in a form file 700 and field data 710 has been entered, as shown in FIG. 7, a form 720 to be generated will be such that the number of lines in a table 721 will vary depending upon the amount of data in the field data 710, and such that the object 704 will be output in a form linked to the table 721. As a result, a needless blank space between the table 721 and object 704 vanishes, as indicated at 722, and a blank line is no longer output in the table 721. A more attractive form is thus obtained.

If it is determined at step S2 that linkage has not been set, then a set value indicative of non-linkage is written in an processing is exited.

Next, at step S4, it is determined whether the variable table has two or more columns. If it is determined at step S4 that the table has one column, then a setting is made to effect linkage to the last line of the table.

Figure 8:
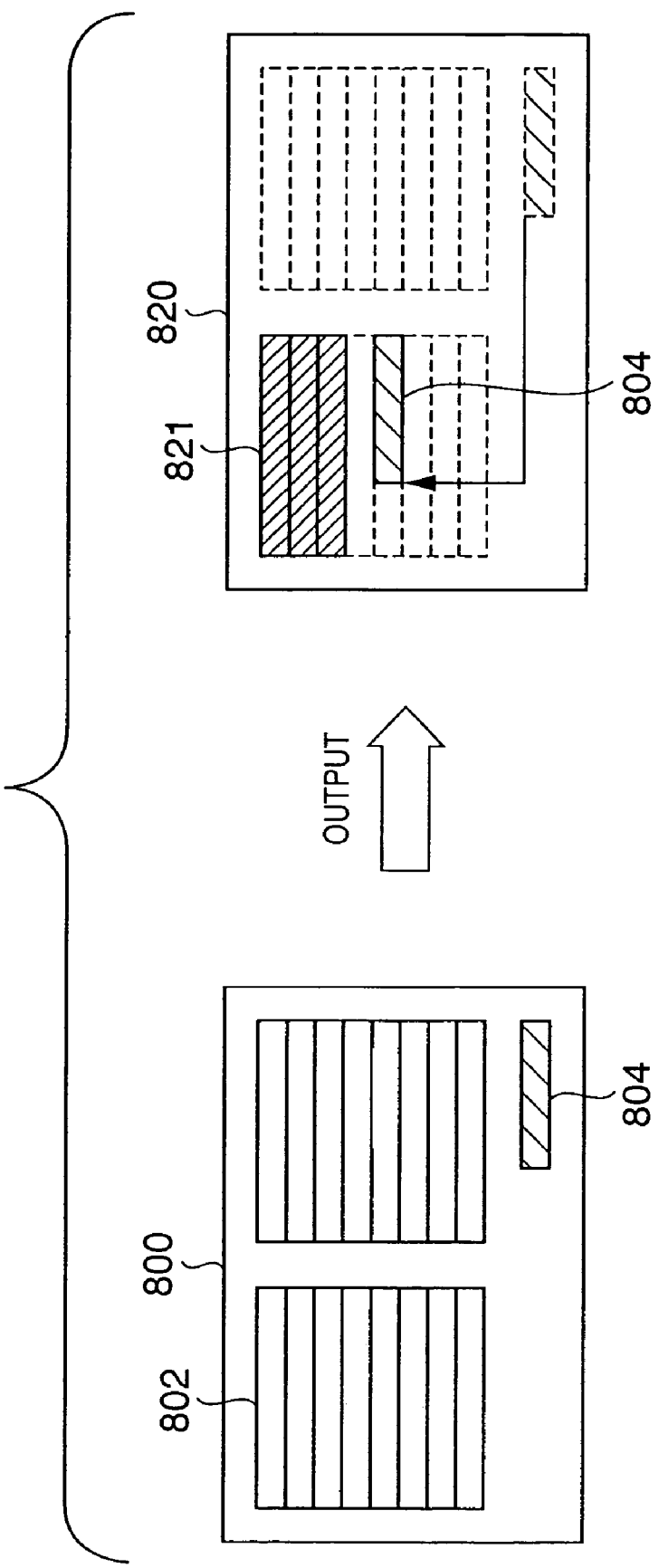
FIG. 8 is a diagram illustrating an example of generation of a form in a case where a setting has been made to link an object to the last line of the final column of a variable table.
Figure 9:
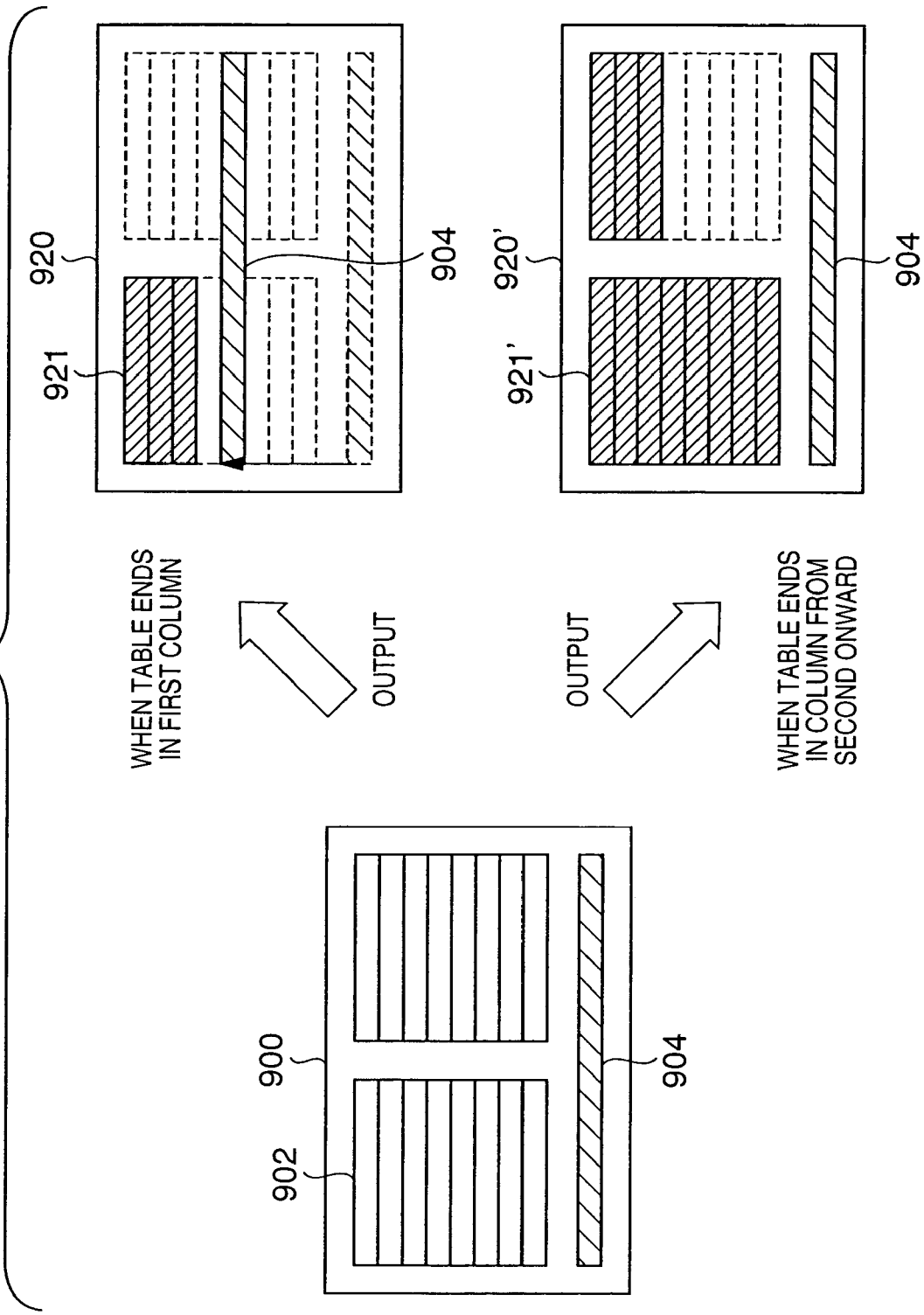
FIG. 9 is a diagram illustrating an example of generation of a form in a case where a setting has been made to link an object to the last line of the first column of a variable table.

On the other hand, if it is determined at step S4 that the table has two or more columns, then the user is allowed to set the object linking method. There are two types of object linking methods, as illustrated in FIGS. 8 and 9. FIG. 8 is a diagram illustrating a method in which linkage is made to the last line of the final column of a variable table. This method is such that if a form file 800 describes a field object 802, which is for outputting a two-column variable table, as well as an object 804, then, when the amount of data in the field data is small and a table 821 of an output form 820 becomes a single-column table as a result, the object 804 is shifted horizontally and is linked to the last line of the final column of the table 821.

On the other hand, FIG. 9 is a diagram illustrating a method in which linkage is made to the last line of the first column of a variable table. This is method is such that if a form file 900 describes a field object 902, which is for outputting a two-column variable table, as well as an object 904, then, when the amount of data in the field data is small and a table 921 of an output form 920 becomes a single-column table as a result, and also when the amount of data in the field data is large and an output table 921' of an output form 920' becomes a table having two or more columns as a result, the object is linked to the last line of the first column of the table 921 (or 921'). In the case of this method, the object 904 is shifted vertically only in a case where the table ends in the middle of the first column. If the first column is filled, the object 904 will not be shifted regardless of the position in columns from the second column onward.

Figure 13:
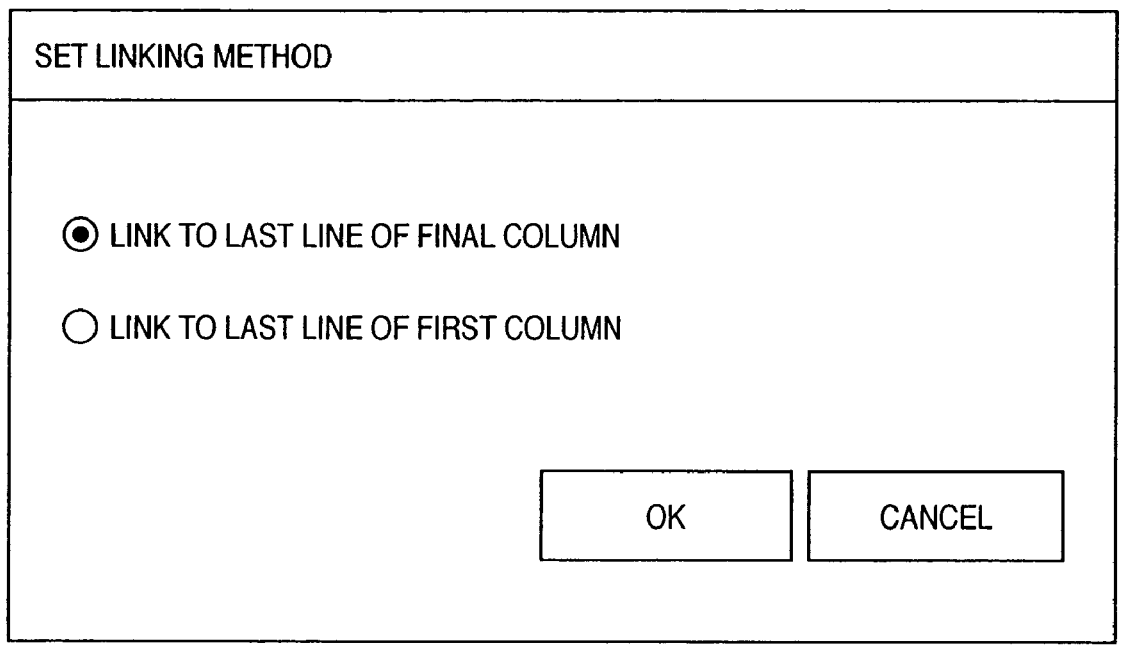
FIG. 13 is a diagram illustrating an example of a designating screen for selecting an object linking method.

It should be noted that whether use is made of the method that links an object to the last line of the final column of a table or the method that links an object to the last line of the first column of a table is set via an attribute dialog box of the kind shown in FIG. 13 by way of example.

When the linking method has been set at step S5, the value that has been set is written to the RAM 12 in association with the field object at step S6. When the object is linked to the table, it is possible, based upon the value written, to switch between linking to the last line of the final column and linking to the last line of the first column.

The offset value [distance (offset X, offset Y) between a field object and an object] in a case where an object is linked to a table is set at step S7. Form-file setting processing for generating a form is completed by the processing set forth above.

The flow of output processing at the time of form generation will now be described with reference to the flowchart of FIG. 11.

In the generation of a form by entering field data into a form file, first it is determined at step S21 whether a table will fit onto the same page as the form.

If it is determined at step S21 that the table will not fit onto the page, then, at step S29, the object is not linked and is output to a default position of the object, which prevails at the time of form-file generation, on a page other than the final page.

On the other hand, if it is determined at step S21 that the table will fit onto the page, then it is determined at step S22 whether linkage has been set to be valid or not.

If it is determined at step S22 that linking is invalid, then the object is not linked and is output to the default position of the object prevailing at the time of form-file creation.

On the other hand, if it is determined at step S22 that linking is valid, then offset values (offset X, offset Y) of the object, which values were set at the time of form-file setting processing, are acquired at step S23.

Next, the object linking method is determined at step S24.

If it is determined at step S24 that the method of linking the object to the last line of the final column has been set, then the position (X coordinate) of the final column and the position (Y coordinate) of the last line of the table that has been output are acquired at step S25.

On the other hand, if it is determined at step S24 that the method of linking the object to the last line of the first column has been set, then it is determined at step S27 whether the table that has been output has reached the last line of the first column.

If it is determined at step S27 that the table has reached the last line of the first column, then the position (X coordinate) of the first column and the position (Y coordinate) of the last line of the table that has been output are acquired at step S28.

At step S26, the offset values (offset X, offset Y) of the object relative to the field object set at the time of form-file setting processing are added to the X and Y coordinates, respectively, acquired at steps S25 and S28, the position at which the object is to be output is calculated and the object is output to this position.

Thus, in accordance with the form processing apparatus of this embodiment, as should be obvious from the described rendered above, a setting can be made that will not produce a needless blank space or blank line when a form is generated, thereby making it possible to generate a more attractive form.

Furthermore, in a form that includes a table having a plurality of columns, a setting can be made to link an object to the last time of the first column or to the last line of the final column of the table. Thus a form having a style desired by the user can be generated in a flexible manner.

[Second Embodiment]

In the first embodiment described above, whether or not linking is performed and the linking method are set using a field-object attribute dialog box. However, the present invention is not limited to this embodiment and the setting can be made by another method.

[Third Embodiment]

According to the first and second embodiments, a set value representing whether or not linking is performed or the linking method is set in association with a field object for every field object for which a variable table is output. However, the present invention is not limited to this embodiment and it may be so arranged that set values representing whether or not linking is performed and the linking method are set in association with individual objects to be linked.

Further, in order to so arrange it that a form-file setting operation can be performed while the user checks whether or not linking is to be performed as well as the linking method, it may be so arranged that symbols expressing whether or not linking is to be performed and the linking method are appended to a table and displayed when the form file is set.

The present invention is not limited to the above embodiments and various changes and modifications can be made within the spirit and scope of the present invention. Therefore, to apprise the public of the scope of the present invention, the following claims are made.

What is claimed is:

1. A form processing method for generating a form by entering data into a form file, which has a field object indicating an output area of the data to be entered into a field, and an object that appears in an area other than the field object, and causing the data to be output in the output area indicated by the field object, comprising:

a linkage determining step of determining whether a setting has been made to link an output position of the object to an output position of the field object into which a variable-length table is output by entering the data;

an offset-value acquisition step of acquiring an offset value between the output position of the object and the output position of the field object into which the variable-length table is output, if it has been determined at said linkage determining step that a setting has been made to link the output position of the object;

an output step of deciding and outputting the output position of the object based upon the offset value and the output position of the field object into which the variable-length table is output; and a setting step of setting the form file, wherein said setting step includes:

a linkage setting step of making a setting, based upon an indication from a user, in such a manner tat the output position of the object and the output position of the field object into which the variable-length table is output will be linked by way of the offset value;

a storing step of storing the setting that has been made at said linkage setting step;

a multiple-column determining step of determining whether a setting has been made such that the field object into which the variable-length table is output will be formed by multiple columns on the same page of the form; and a linking-method setting step of setting a linking method for linking the output position of the object to the output position of the field object into which the variable-length table is output, if it has been determined at said multiple-column determining step that a setting has been made such that the field object will be formed by the multiple columns.

2. The method according to claim 1, wherein linking methods capable of being set at said linking-method setting step include a linking method of linking the output position of the object to the last line of the final column of the variable-length table that is output into the field object, and a linking method of linking the output position of the object to the last line of the first column of the variable-length table that is output into the field object.

3. The method according to claim 1, wherein said setting step further includes a display step of displaying a symbol indicating the setting that has been made at said linking setting step.

4. The method according to claim 1, wherein said setting step further includes a display step of displaying a symbol indicating the setting that has been made at said linking-method setting step.

5. The method according to claim 1, wherein said storing step stores the setting, which has been made at said linkage setting step, in association with the field object for which the variable-length table is output.

6. The method according to claim 1, wherein the linking method is set in association with the object at said linkage setting step.

7. The method according to claim 1, wherein one linking method capable of being set at said linking-method setting step is a linking method of linking to the last line of the final column of the variable-length table.

8. The method according to claim 7, wherein if the linking method of linking to the last line of final column is set at said linking-method setting step, the output position of the object to be linked is decided at said output step so that the object is output at a lower position which is the acquired offset-value below the output position of the final column of the variable-length table having multiple columns.

9. A form processing program stored on a computer-readable medium for causing the computer to implement a form processing method of generating a form by entering data into a form file, which has a field object indicating an output area of the data to be entered into a field, and an object that appears in an area other than the field object, and causing the data to be output in the output area indicated by the field object, said program including program code for causing the computer to execute the following steps:
   a linkage determining step of determining whether a setting has been made to link an output position of the object to an output position of the field object into which a variable-length table is output by entering the data;
   an offset-value acquisition step of acquiring an offset value between the output position of the object and the output position of the field object into which the variable-length table is output, if it has been determined at said linkage determining step that a setting has been made to link the output position of the object;
   an output step of deciding and outputting the output position of the object based upon the offset value and the output position of the field object into which the variable-length table is output; and
   a setting step of setting the form file, wherein said setting step includes:
   a linkage setting step of making a setting, based upon an indication from a user, in such a manner that the output position of the object and the output position of the field object into which the variable-length table is output will be linked by way of the offset value;
   a storing step of storing the setting that has been made at said linkage setting step;
   a multiple-column determining step of determining whether a setting has been made such that the field object into which the variable-length table is output will be formed by multiple columns on the same page of the form; and
   a linking-method setting step of setting a linking method for linking the output position of the object to the output position of the field object into which the variable-length table is output, if it has been determined at said multiple-column determining step that a setting has been made such that the field object will be formed by the multiple columns.

10. The form processing program according to claim 9, wherein linking methods capable of being set at said linking-method setting step include a linking method of linking the output position of the object to the last line of the final column of the variable-length table that is output into the field object, and a linking method of linking the output position of the object to the last line of the first column of the variable-length table that is output into the field object.

11. The form processing program according to claim 9, wherein said setting step further includes a display step of displaying a symbol indicating the setting that has been made at said linking setting step.

12. The form processing program according to claim 9, wherein said setting step further includes a display step of displaying a symbol indicating the setting that has been made at said linking-method setting step.

13. The form processing program according to claim 9, wherein said storing step stores the setting, which has been made at said linkage setting step, in association with the field object for which the variable-length table is output.

14. The form processing program according to claim 9, wherein the linking method is set in association with the object at said linkage setting step.

15. The form processing program according to claim 9, wherein one linking method capable of being set at said linking-method setting step is a linking method of linking to the last line of the final column of the variable-length table.

16. The form processing program according to claim 15, wherein if the linking method of linking to the last line of final column is set at said linking-method setting step, the output position of the object to be linked is decided at said output step so that the object is output at a lower position which is the acquired offset-value below the output position of the final column of the variable-length table having multiple columns.

17. A form processing apparatus for generating a form by entering data into a form file, which has a field object indicating an output area of the data to be entered into a field, and an object that appears in an area other than the field object, and causing the data to be output in the output area indicated by the field object, comprising:
   a linkage determining unit configured to determine whether a setting has been made to link an output position of the object to an output position of the field object into which a variable-length table is output by entering the data;
   an offset-value acquisition unit configured to acquire an offset value between the output position of the object and the output position of the field object into which the variable-length table is output if it has been determined by said linkage determining unit that a setting has been made to link the output position of the object;
   an output unit configured to decide and output the output position of the object based upon the offset value and the output position of the field object into which the variable-length table is output; and
   a setting unit configured to set the form file, wherein said setting unit includes:
   a linkage setting unit configured to make a setting, based upon an indication from a user, in such a manner that the output position of the object and the output position of the field object into which the variable-length table is output will be linked by way of the offset value;
   a storing unit configured to store the setting that has been made at said linkage setting unit;
   a multiple-column determining unit configured to determine whether a setting has been made such that the field object into which the variable-length table is output will be formed by multiple columns on the same page of the form; and
   a linking-method setting unit configured to set a linking method for linking the output position of the object to the output position of the field object into which the variable-length table is output, if it has been determined at said multiple-column determining unit that a setting has been made such that the field object will be formed by the multiple columns.

18. The form processing apparatus according to claim 17, wherein linking methods capable of being set by said linking-method setting unit include a linking method of linking the output position of the object to the last line of the final column of the variable-length table that is output into the field object, and a linking method of linking the output position of the object to the last line of the first column of the variable-length table that is output into the field object.

19. The form processing apparatus according to claim 17, wherein said setting unit further includes a display unit configured to display a symbol indicating the setting that has been made by said linking setting unit.

20. The form processing apparatus according to claim 17, wherein said setting unit further includes a display unit configured display a symbol indicating the setting that has been made by said linking-method setting unit.

21. The form processing apparatus according to claim 17, wherein said storing unit stores the setting, which has been made by said linkage setting unit, in association with the field object for which the variable-length table is output.

22. The form processing apparatus according to claim 17, wherein the linking method is set in association with the object by said linkage setting unit.

23. The form processing apparatus according to claim 17, wherein one linking method capable of being set by said linking-method setting unit is a linking method of linking to the last line of the final column of the variable-length table.

24. The form processing apparatus according to claim 23, wherein if said linking-method setting unit sets the linking method of linking to the last line of final column, said output unit decides the output position of the object to be linked so that the object is output at a lower position which is the acquired offset-value below the output position of the final column of the variable-length table having multiple columns.

* * * * *

UNITED STATES PATENT AND TRADEMARK OFFICE
CERTIFICATE OF CORRECTION

PATENT NO. : 7,206,999 B2  Page 1 of 1
APPLICATION NO. : 10/890193
DATED : April 17, 2007
INVENTOR(S) : Kato It is certified that error appears in the above-identified patent and that said Letters Patent is hereby corrected as shown below:

COLUMN 7:
Line 38, "time" should read -- line --.

COLUMN 8:
Line 26, "tat" should read -- that --.

COLUMN 9:
Line 6, "final" should read -- the final --.

COLUMN 10:
Line 20, "final" should read -- the final --.

COLUMN 11:
Line 15, "configured" should read -- configured to --.

COLUMN 12:
Line 11, "final" should read -- the final --.

Signed and Sealed this

Fourth Day of December, 2007

JON W. DUDAS
*Director of the United States Patent and Trademark Office*